(12) United States Patent
Balla et al.

(10) Patent No.: US 9,152,534 B2
(45) Date of Patent: Oct. 6, 2015

(54) SYSTEM AND METHOD FOR VALIDATING CONFIGURATION SETTINGS

(71) Applicant: Tata Consultancy Services Limited, Mumbai (IN)

(72) Inventors: Ramalingeswara Rao Balla, Hyderabad (IN); Jyothsna Devarakonda, Hyderabad (IN)

(73) Assignee: TATA CONSULTANCY SERVICES LIMITED (IN)

( * ) Notice: Subject to any disclaimer, the term of this patent is extended or adjusted under 35 U.S.C. 154(b) by 358 days.

(21) Appl. No.: 13/875,522

(22) Filed: May 2, 2013

(65) Prior Publication Data

US 2014/0143605 A1    May 22, 2014

(30) Foreign Application Priority Data

Nov. 16, 2012    (IN) .......................... 3307/MUM/2012

(51) Int. Cl.
*G06F 11/36*    (2006.01)
*G06F 9/445*    (2006.01)

(52) U.S. Cl.
CPC ........ *G06F 11/3604* (2013.01); *G06F 9/44505* (2013.01)

(58) Field of Classification Search
CPC .......................... G06F 11/3604; G06F 9/44505
See application file for complete search history.

(56) References Cited

U.S. PATENT DOCUMENTS

| | | | |
|---|---|---|---|
| 6,766,364 B2 | 7/2004 | Moyer | |
| 7,475,235 B1 * | 1/2009 | Bernardy et al. | ................. 713/1 |
| 7,685,412 B1 | 3/2010 | Burdick | |
| 8,321,843 B2 | 11/2012 | Lanner et al. | |
| 8,725,997 B2 * | 5/2014 | Tukol et al. | ....................... 713/2 |
| 2006/0123040 A1 | 6/2006 | McCarthy et al. | |
| 2009/0276486 A1 * | 11/2009 | Tandon et al. | ................ 709/203 |
| 2012/0185925 A1 | 7/2012 | Barkie et al. | |

OTHER PUBLICATIONS

Bilal Aslam ",Validate Your Server Configuration," http://www.iis.net/learn/web-hosting/joining-the-web-hosting-gallery/validate-your-server-configuration (2013).
Bill Evjen "Validating ASP.NET Server Controls," http://msdn.microsoft.com/en-us/library/aa479013.aspx#aspnet-validateaspnetservercontrols_topic8 (2013).

* cited by examiner

*Primary Examiner* — Thuan Du
(74) *Attorney, Agent, or Firm* — Finnegan, Henderson, Farabow, Garrett & Dunner LLP

(57) ABSTRACT

The present disclosure relates to a system and method for providing a validation tool to automate in validation of the configuration settings of the computing devices and their interaction thereof for an enterprise application over a network. Also, the present disclosure validates the configurations of the enterprise application which is deployed and executed over the computing devices. Further, the present disclosure provides a method for verifying the configurations settings and applying the required configuration settings across the computing devices, if the existing configuration settings of said computing devices are not verified. Upon verifying and/or applying the configuration settings, said validation tool is configured to generate a compliance report and further notify said generated report to the intended user of a group.

16 Claims, 3 Drawing Sheets

SYSTEM AND METHOD FOR VALIDATING CONFIGURATION SETTINGS

PRIORITY CLAIM

This disclosure claims priority under 35 U.S.C. §119 to: India Application No. 3307/MUM/2012 filed on Nov. 16, 2012. The aforementioned application is incorporated herein by reference in its entirety.

TECHNICAL FIELD

The present subject matter described herein generally relates to a field of validating configuration settings for an enterprise application.

BACKGROUND

Enterprise applications or web-based applications are specific to business functions, performing various typical tasks over a network. The network may comprise a number of servers, end-user computers and other computing terminals over which these enterprise applications are deployed and executed. Validating each server setup, end-user computer settings, application configuration settings as well as their interactions amongst them is a complex and an error prone process. In a globally controlled and locally managed (GCLM) environment, lots of manual intervention that involves key expertise availability and effort is typically used for validation and further, it is a time consuming process. Accordingly, there is a significant risk of errors. Also, maintaining parallel coordination among the users having application specific knowledge of the enterprise applications over the network is difficult.

Also, there are number of check-points or checklists which are to be considered during the validation process, and therefore, there is a chance of missing these check-points. Moreover, these enterprise applications are developed on various platforms and have specific requirements. These specific requirements must be addressed for errorless and flawless execution of the applications over the servers and end-user computers.

Moreover, in the validation process, the configurations settings of the servers and end-user computers need to be verified in relative to the required parameters and environment. And, after completion of the verification process, the required configuration settings must be applied across the servers and end-user computers.

SUMMARY

Before the present system and method, enablement are described, it is to be understood that this application is not limited to the particular systems and methodologies described, as there can be multiple possible embodiments which are not expressly illustrated in the present disclosure. It is also to be understood that the terminology used in the description is for the purpose of describing the particular versions or embodiments only, and is not intended to limit the scope of the present disclosure.

The present disclosure introduces computer-implemented systems and computer-implemented methods for enabling automation in validating configuration settings across different levels of computing devices for an enterprise application. Some embodiments facilitate verification of existing configuration settings and/or applying of required configuration settings in relative to optimal configuration settings across multiple servers and end-user computer sequentially over a network in a one-click action. The optimal configuration settings may be standard settings stored in the XML or config file against which the existing configuration settings may be verified or the required configuration settings may be applied over the computing devices. Embodiments of the present disclosure are further configured to validate the configuration settings of the enterprise application. Such systems may be configured to set user-defined parameters of a configuration file depending on the server setup documents and end-users computer setup documents. After setting the parameters, an executable file may be executed to invoke a validation tool through a graphical user interface (GUI) mode. Through the GUI mode, the user may be prompted to select an option and one or more corresponding parameters for validating the configuration settings. The option selected by the user may include a verifying option for the purpose of verifying the existing configuration settings, applying option for the purpose of applying the required configuration settings, if the existing configuration settings are not in accordance with the server setup and end-user computer setup documents. Upon capturing the user selected option, the system may respond by verifying the existing configuration settings across the servers and end-user computers based on the preset parameters complying with the enterprise applications. If the existing configuration settings of the computing devices are not compliant in accordance with the enterprise application, the system may be further configured to apply the required configuration settings to comply with the requirements of the enterprise application. The required configuration settings may be stored in an xml or in a config file, where the xml or the config file is an in-built component of the validation tool.

A compliance report may be generated based on the validation process of the requirement specific configuration settings and further, the system may be enabled for notifying the generated report to the intended user or a group through an electronic communication.

BRIEF DESCRIPTION OF THE DRAWINGS

The foregoing summary, as well as the following detailed description of preferred embodiments, is better understood when read in conjunction with the appended drawings. For the purpose of illustrating the disclosure, there is shown in the drawings various stages of the disclosure; however, the disclosure is not limited to the specific apparatus and method disclosed in the drawings.

DETAILED DESCRIPTION

Figure 1:
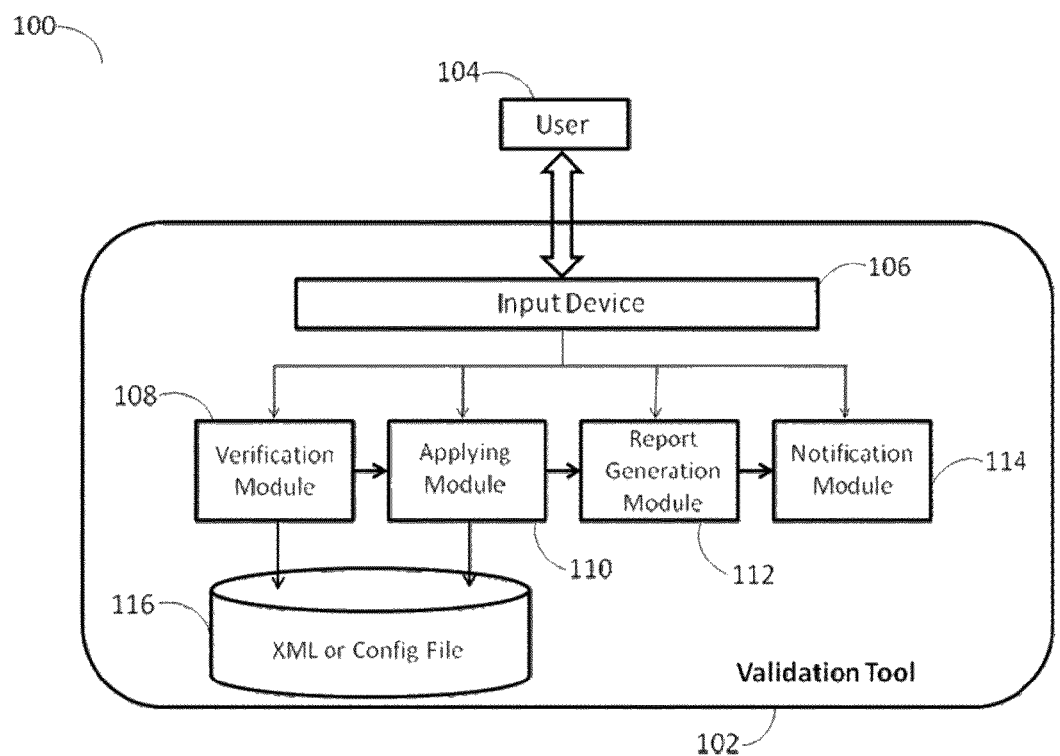
FIG. 1 is a block diagram of the system (100) illustrating multiple embodiments of the present disclosure.

The disclosure will now be described with respect to various embodiments. The following description provides specific details for understanding of, and enabling description for, these embodiments of the disclosure. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It will be readily understood that the components of the present disclosure, as generally described and illustrated in the Figures herein, could be arranged and designed in a wide variety of different configurations. Thus, the following more detailed description of the embodiments of the disclosure, as represented in the Figures and flowcharts, is not intended to limit the scope of the disclosure, as claimed, but is merely representative of certain examples of presently contemplated embodiments in accordance with the disclosure.

The presently described embodiments will be best understood by reference to the drawings, wherein like parts are designated by like numerals throughout. Moreover, flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s).

Embodiments of the present disclosure generally provide computer-implemented systems and computer-implemented methods for automatically validating configuration settings across different levels of computing devices and among their interactions thereof. Also, embodiments of the present disclosure are enabled for validating configuration settings of the enterprise application that is to be deployed across the computing devices. The method of validation may be conducted in an automated way with a one-click action with minimum user intervention. Also, the method of validation can be conducted in command line mode. Depending upon the user's choice, the validation tool may be executed for the validation process.

According to different business solutions or architecture, a number of servers and end-user computers or computing devices may be connected with each other over a network for achieving a specific goal. For achieving this goal, embodiments of the present disclosure have configured an automated validation tool for the purpose of validating the configuration settings of the computing devices. The automated validation tool may be accessible through a graphical user interface (GUI) mode or command line mode. In GUI mode, a user, in embodiments of the present disclosure, may be required to select options i.e., whether to verify the existing configuration settings or to apply the required configuration settings based on the requirement.

It should be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

In an embodiment of the disclosure, the validation tool comprises of an input device for capturing the user input and various process-executable modules. Each said processor-executable module and the input device may perform a particular set of task upon execution of the processor. The user in the present disclosure may be required to set parameters of a configuration file through the input device. The parameters, which may be set by the user, may be accordance with the server setup documents and end-users computer setup documents, wherein upon servers and end-user computers the enterprise application may be deployed and executed. The input device may be also configured to capture the option and their corresponding parameters selected by the user from the invoked GUI. The GUI mode may be invoked upon the execution of an executable file. The option which may be selected by the user includes a verifying option for verifying the existing configuration settings or an applying option for applying the required configuration settings upon verifying the existing configuration settings.

The user can access the validation tool through the invoked GUI mode or through the command line mode. After setting the parameters and capturing the option selected by the user, a verification module, one the processor-executable module of the present disclosure may be configured to verify the existing configuration settings of the computing devices in relative to the preset parameters sequentially across the network i.e., the servers and the end-user computers and their interactions thereof. The verification module may be also configured to verify the configuration settings of the enterprise application which may be deployed and executed over the computing devices. The computing devices can be servers, end-user computers and other computing terminals connected over the network.

The validation tool may also facilitate an applying module which may be configured to apply the required configuration settings upon the computing devices sequentially over the network where the existing configuration settings of the computing devices may be not present as per the optimal configuration settings or not compliant with the requirements of the enterprise application. The optimal configuration settings may be the standard settings stored in the XML or config file against which the existing configuration settings may be verified or the required configuration settings may be applied over the computing devices. The function of the applying module may be to first verify the existing configuration settings of the computing devices and then apply the required configuration settings upon the computing devices, if said required configuration settings are not present in the computing devices. The entire diagnostic check of the computing devices and the application configuration i.e., either to verify or apply the requirement-specific configuration settings may be performed in a one click action. The required configuration settings may be stored in xml or a config file. The validation tool may be adaptive in nature and can verify or apply the configuration settings irrespective of bandwidth of technology, application type and technology. The validation tool may support the configuration settings for .net 2.0, .net 3.0 and .net 4.0 based applications. Also, it may support settings for IIS 6 and IIS 7.5 and settings for, .net ASMX and WCF based web services. The xml file or the config file may include the optimal configuration settings for a .net based web applications, Internet Information Services (IIS) where Windows Communication Foundation (WCF) and Active Server Methods (ASMX) based services and web applications may be hosted, .net based web or windows applications which may be invoking WCF and/or ASMX services and for Win-Form based applications. Further, the required or the optimal configuration settings can be updated or a new element can be added to it upon inclusion of additional servers or end-user computers or additional applications to the enterprise or upgrade to any these.

After verifying and applying the required configurations settings across the computing devices, a report generation module may be configured to generate a compliance report. The compliance report comprises of a compliance percentage summary which may be calculated based on an assigned score, priority and weightage to logical category, wherein said logical category comprises of different configuration settings and their respective attributes. The compliance report generated may be further notified to intended user of a group through a notification module. The notification module may notify the intended user or the group by an electronic communication device. The electronic communication can be an e-mail communication or a short message service (SMS).

In another embodiment of the present disclosure the computer-implemented method may be considered to provide automation in validating the configuration settings of the computing devices and application configuration over the network. For enabling the validation process, set of processor-enabled steps may be performed by the processor-executable programmed modules, wherein the steps includes; setting the parameters of a configuration file according to a computing environment. The computing environment includes the server setup documents and end-user setup documents. The parameters may be set by the user through the input device, wherein the parameters may be accordance with the requirement of the enterprise application which may be deployed and executed over the computing devices of the network.

After setting the parameters, step of executing an executable file may be performed to invoke the graphical user interface (GUI). Through the invoked GUI mode, user can access the validation tool for the purpose of validating the configuration settings. From the invoked GUI, a step may be performed for prompting the user to select an option and their corresponding parameters. The option selected by the user may be a verifying option for verifying the existing configuration settings or an applying option for applying the required configuration settings, if the existing configuration setting is not in accordance with the requirement. Upon responding on the option selected by the user, step of verifying the existing configuration settings across the computing devices sequentially and their interactions amongst them may be performed. The verification of the existing configuration settings may be performed in relative to the preset parameters, which may be set by the user, for complying with the enterprise application. Also, the configuration of the enterprise application which may be deployed on the computing devices may be verified in the verification step.

An additional step may be provided for applying the required configuration settings across said computing devices. According to this step, the required configuration settings may be applied upon the computing devices where the existing or present configuration setting of the computing devices are not compliant with the optimal configuration settings of the deployed enterprise application. This particular step firstly may verify the existing configuration settings and then apply the required configuration settings sequentially across the computing devices, if the existing configuration settings of the computing devices are not verified or compliant in accordance with the requirement. The entire diagnostic check of the computing devices and the application configuration i.e., either to verify or apply the configuration settings may be performed in a one click action. The required configuration settings may be stored in xml or a config file. The xml file or the config file further contains the optimal configuration settings for a .net based web applications, Internet Information Services (IIS) where Windows Communication Foundation (WCF) and Active Server Methods (ASMX) based services and web applications may be hosted, net based web or windows applications which may be invoking WCF and/or ASMX services and for Win-Form based applications. Further, the required or the optimal configuration settings can be updated or a new element can be added to it upon inclusion of additional servers or end-user computers or additional applications to the enterprise or upgrade to any these.

Upon verifying and applying the required configuration settings, step of generating a compliance report may be performed. After generation of the report, the system may be further configured for notifying the compliance report generated to the intended user or a group. The notification may be done through an electronic communication device which may include an email communication and a short message service (SMS).

In another embodiment of the present disclosure, said validation tool may be anticipative in nature and provide schedule downtime and predictive failures. The validation tool may be capable of checking the presence of the optimal or required configuration settings as per the xml or the config file. Based on their presence, the tool may share the compliance report which may be an indication of the predictive failures. On the basis of predictive failures, an administrator can schedule the downtime to increase the compliance, which minimizes the failures. Further, the validation tool may have capability to verify maintenance activities like restart, disk space usage, and disk clean up, disk fragmentation and verification/set of event viewer logs size. The validation tool may verify the availability of the enterprise application and its services and based on these settings results, the tool may moderately notify predictive failures to administrator or stakeholder in the form of the compliance report.

Yet in another embodiment of the present disclosure, the validation tool may be enabled for providing automation in calculating a compliance percentage after the validation of the configuration settings of the computing devices. The report generation module may be configured to generate a compliance percentage summary which may be calculated for the different categories of the configuration settings. In an embodiment, the different categories for which compliance percentage may be calculated includes Pre-Requisites, Registry Settings, Access Permissions, IIS Settings etc, Further, the validation tool may be also capable for calculating the compliance percentage for the various attributes of the categories of the configuration settings. For example, the attributes for the category Pre-Requisites may be OS, Os patch, .net framework etc. The different categories of configuration settings and their attributes can be seen from Table 1 and Table 2 respectively.

One of the approaches for calculating the compliance percentage may be to give same score and same priority to the logical category or group and each sub activity. Thus, compliance percentage may be calculated on average method. Considering a case, where we need to verify total 10 settings in one group and among said 10 settings 5 settings are not as per standards. So the compliance is (5/10)*100=50%. Therefore, the overall compliance of the category is equal to the average of all items or activities as can be seen from Table 1.

TABLE 1

Overall Compliance

| Category: | Individual compliance |
|---|---|
| Pre-Requisites | 91% |
| Registry Settings | 87% |

TABLE 1-continued

Overall Compliance

| Category: | Individual compliance |
|---|---|
| Access Permissions | 100% |
| Configurations | 89% |
| IIS Settings | 77% |
| System Settings | 87% |
| Maintenance Activities | 75% |
| Overall Compliance | 86% |

TABLE 1

Compliance at category

| Attribute under Pre-Requisites | Status | Individual compliance % |
|---|---|---|
| OS | pass | 100 |
| OS Patch | pass | 100 |
| IE | pass | 100 |
| .Net Framework | pass | 100 |
| .net Framework for WCF Extensions | Fail | 0 |
| Visual Studio | pass | 100 |
| Oracle | pass | 100 |
| MS Office | pass | 100 |
| IIS | pass | 100 |
| Acrobat Reader | pass | 100 |
| Symantec Antivirus | pass | 100 |
| Category Compliance | NA | 91% |

As per the present disclosure, another approach to calculate the compliance percentage can be understood with the reference of Table 3 and Table 4 given below. According to this approach, weightage may be assigned to logical categories or the groups (egg: Pre-requisites, IIS settings, Maintenance activities, etc) based on the priority. Similarly, the individual activities may be also assigned with the weightage. Configurable option may be be provided to consider either (Weightage—A only) or (Weightage—A & Weightage—B) as can been seen from the Table 3 and Table 4. Activity score may be set to 100 or 0 based on evaluation result (passed, failed, not selected or interrupted). Further, for calculating the compliance score of the activity can be calculated with the following formulae:

Compliance score of a activity=(score of a activity)*(weight of the activity)

Similarly, the normalized score of a group can be calculated with the following formulae:

Normalized score of a group=(Sum of the scores of the rules or groups under the group)/(sum of the weights of the rule or groups under the group)

Similarly, the Compliance score of a group can be calculated using the following formulae:

Compliance score of a group=(Normalized score)*(Weight of the group)

Similarly, the Total compliance can be calculated using the following formulae:

Total Compliance=(Sum of the scores of the groups)/(sum of the weights of the groups)

TABLE 3

Compliance at category

| Attribute under Pre-Requisites | Weightage-A | Status | Individual Compliance % | Score |
|---|---|---|---|---|
| OS | 5 | pass | 100 | 500 |
| OS Patch | 4 | pass | 100 | 400 |
| IE | 2 | pass | 100 | 200 |
| .Net Framework | 5 | pass | 100 | 500 |
| .net Framework for WCF Extensions | 5 | Fail | 0 | 0 |
| Visual Studio | 4 | pass | 100 | 400 |
| Oracle | 5 | pass | 100 | 500 |
| MSOffice | 2 | pass | 100 | 200 |
| IIS | 5 | pass | 100 | 500 |
| Acrobat Reader | 3 | pass | 100 | 300 |
| Symantec Antivirus | 5 | pass | 100 | 500 |
| Sum | 45 | | | 4000 |
| Category Compliance | NA | NA | NA | 4000/45 = 89% |

TABLE 4

Overall Compliance

| Category | Weightage-B | Individual Compliance | Score |
|---|---|---|---|
| Pre-Requisites | 5 | 89 | 445 |
| Registry Settings | 4 | 100 | 400 |
| Access Permissions | 3 | 90 | 270 |
| Configurations | 3 | 89 | 267 |
| IIS Settings | 5 | 100 | 500 |
| System Settings | 5 | 70 | 350 |
| Maintenance Activities | 3 | 100 | 300 |
| SUM | 28 | NA | 2532 |
| Overall Compliance | NA | NA | 2352/28 = 84% |

Next, the preferred embodiments of the present disclosure will be described below based on drawings.

FIG. 1 is a block diagram of the system (100) illustrating multiple embodiments of the present disclosure. The system (100) comprises a processor, a memory unit coupled with said processor having set of instruction stored therein, validation tool (102), which may be accessible by the user. The validation tool (102) further comprises of an input device (106) and a set of processor-executable programmed modules such as a verification module (108), applying module (110), report generation module (112) and a notification module (114). According to the various embodiments of the present disclosure, the methods described herein are intended for operation as computer programs modules running on a computer processor.

The input device (106) may be configured to allow the user (104) to set parameters of a configuration file. The parameters may be set according to the server setup documents and end-user setup documents upon which the enterprise application may be deployed and executed. The input device (106) also captures the option and their corresponding parameters selected by the user from an invoked GUI. The GUI mode may be invoked upon the execution of an executable file. The option which may be selected by the user can be a verifying option for verifying the existing configuration settings or an applying option for applying the required configuration settings, if the existing configuration setting is not compliant with the requirement.

Through the invoked GUI, the user can access the validation tool (102). Considering a scenario where the user selects the verifying option, a verification module (108) may verify the existing configuration settings of the computing devices sequentially and their interaction across the network in relative to the preset parameters. Also, the verification module (108) may be configured to verify the configuration settings of the enterprise application that may be deployed and executed over the computing devices. Here the computing devices can include servers, end-user computers and other computing terminals connected over the network. Considering an another scenario where the user selects the apply option from the invoked GUI, the applying module (110) of the tool (102), firstly may verify the existing configuration settings of the computing devices sequentially and thereafter the applying module may be further configured to apply the required configuration settings upon those computing devices over the network, where the existing configuration settings may be not present as per the optimal configuration settings or it is not in accordance with the requirements. This entire diagnostic check of verifying the existing configuration settings of the computing devices or applying the required configuration settings across the computing devices may be performed in a one click action through the invoked GUI. The required configuration settings may be stored in xml or a config file (116).

After the verification of the existing configuration settings and/or applying of the required configuration settings across the computing devices, the report generation module (112) may be configured to generate the compliance report. The compliance report generated may be further notified by the notification module (114). The notification module (114) may notify the compliance report to the intended user or the group by an electronic communication device. The electronic communication can be an e-mail communication or a short message service (SMS).

Figure 2:
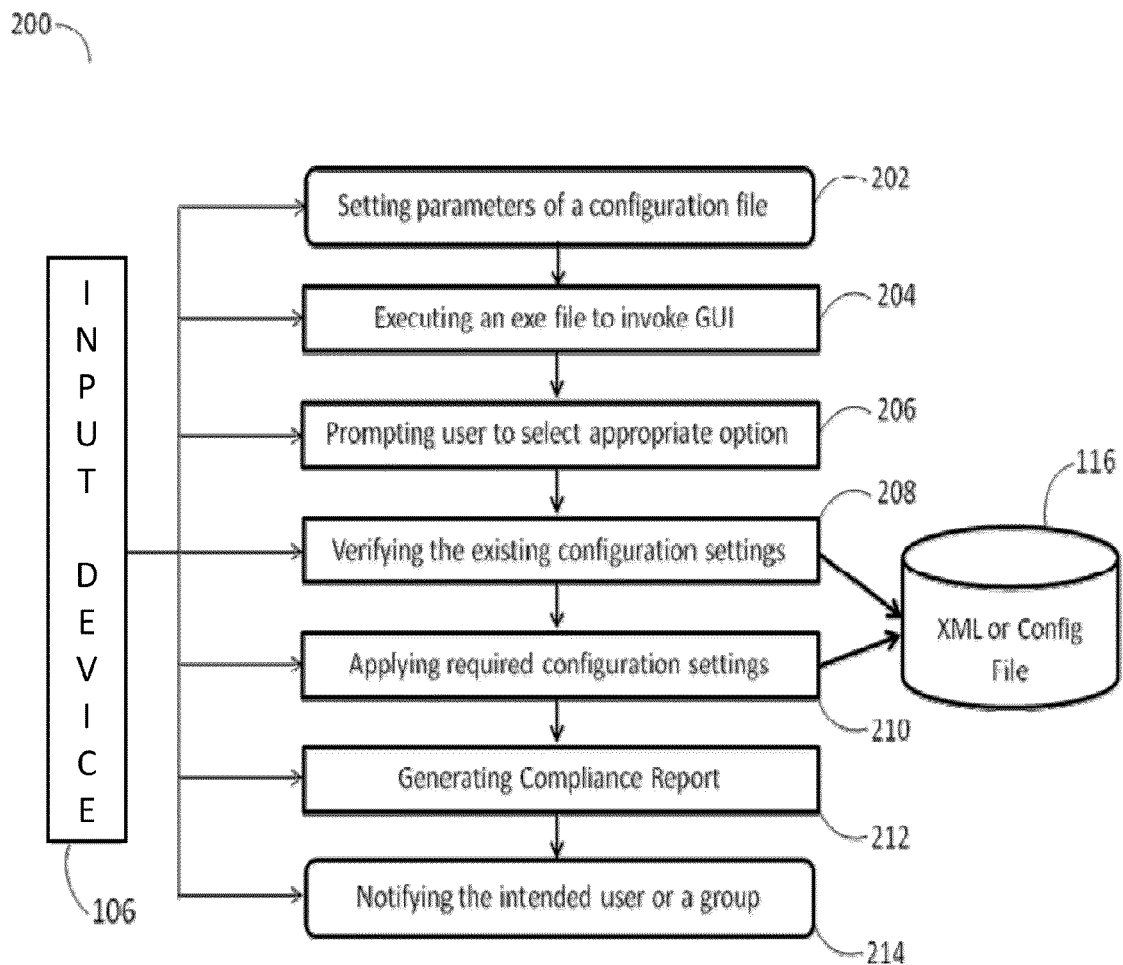
FIG. 2 is a flow diagram (200) illustrating the automated configuration settings validation process according to one aspect of the present disclosure.

FIG. 2 is a flow diagram (200) illustrating the automated configuration settings validation process according to one aspect of the present disclosure. For enabling the validation of the configuration settings, various processor executable steps may be performed, wherein the steps includes; setting parameters of a configuration file (202), wherein the parameters may be set by the user (104 of FIG. 1) through the input device (106 of FIG. 1). The parameters which may be set by the user (104 of FIG. 1) may be in accordance with the server setup documents and end-user computer setup documents over which the enterprise applications may be deployed and executed. After setting the parameters, step of executing an exe file to invoke a GUI (204) may be performed. Through the invoked GUI mode, the user (104 of FIG. 1) may access the validation tool (102 of FIG. 1) for validating the configuration settings. The step of prompting the user to select an option (206) may be performed, wherein the user can select a verify option or apply option to verify the existing configuration settings or apply the required configuration settings respectively over the computing devices.

Upon responding to the user selected option, where it may be considered that the user has selected the verify option, step of verifying the existing configuration settings (208) may be performed. The configuration settings of the computing devices and their interactions may be verified in relative to the preset parameters. Also, the configuration of the enterprise application which may be deployed on the computing devices may be verified as per the specific requirement. Now considering the case where user has selected the apply option, step of applying the required configuration settings (210) may be performed. According to the step (210), the validation tool (102 of FIG. 1) firstly may verify the existing configuration settings of the computing devices sequentially and applies the required configuration settings upon those computing devices where the existing configuration settings of the computing devices may be not present as per the optimal configuration settings or it is not in compliance with the deployed enterprise application.

The entire diagnostic check of the computing devices and the application configuration may be performed in a one click action. The required configuration settings may be stored in xml or a config file (116 of FIG. 1). After the verification of the existing configuration settings according to step (208) or applying the required configuration settings according to step (210), step of generating compliance report (212) may be performed, where the compliance report upon the validation of the configuration settings may be generated. After the compliance report generation, step of notifying the intended user of a group (214) may be performed. The notification may be done through an electronic communication device, wherein the electronic communication may be an email communication and a short message service (SMS).

Figure 3:
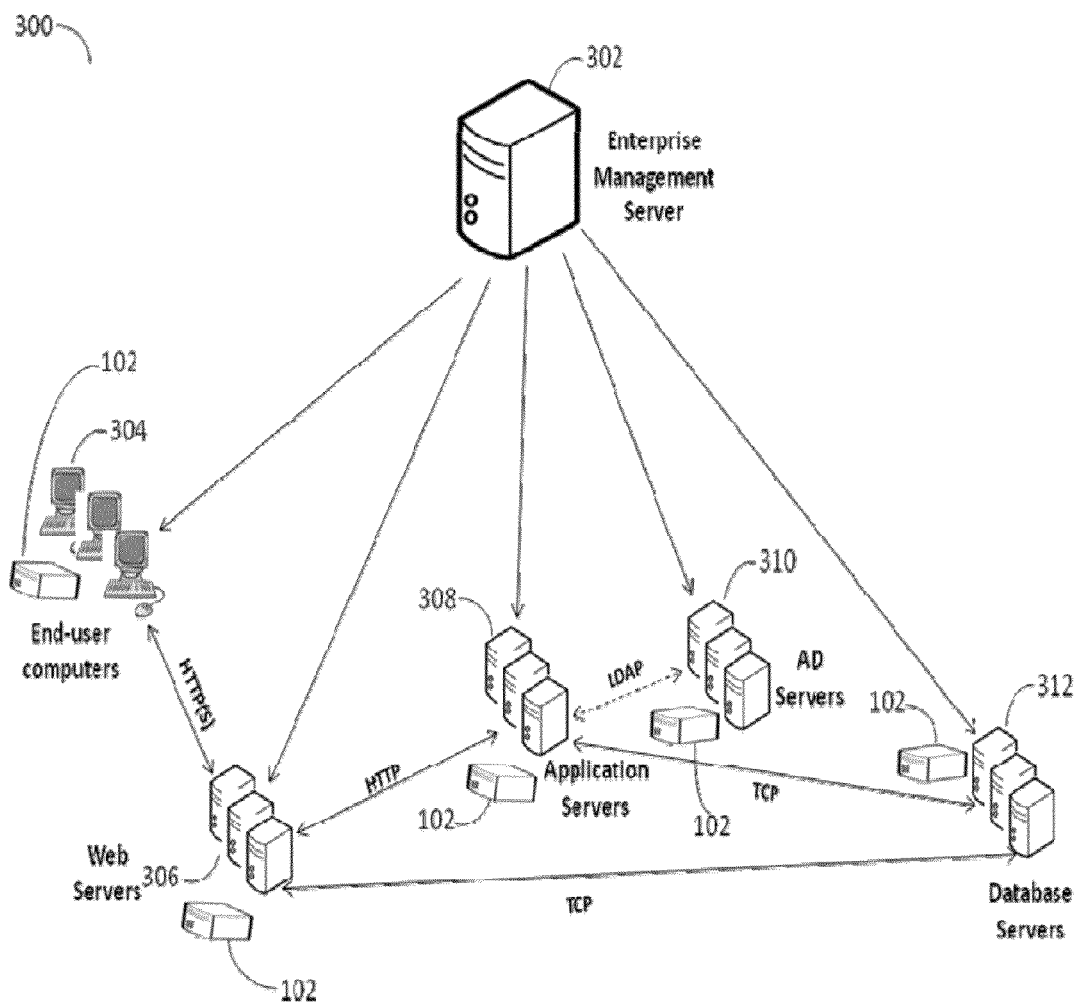
FIG. 3 is an illustration of the automated configuration settings validation method (300) across the computing devices in one aspect of the present disclosure.

FIG. 3 is an illustration of the configuration settings validation method (300) across the computing devices over a network in one aspect of the present disclosure. As can be seen from the FIG. 3, there may be multiple end-user computers (304), web servers (306), application servers (308), active directory (AD) servers (310) and database servers (312) collectively referred as "computing devices" may be connected with an Enterprise management server (302) over the network. The computing devices may be inter-connected with each other through different network protocols such as HTTP (Hyper-Text transfer protocol), HTTPS (Hyper-Text transfer protocol secure), TCP (Transmission Control Protocol) and LDAP (Lightweight Directory Access Protocol). The enterprise management server (302) can be a separate server or one of a windows server. The enterprise management server (302) may be configured for scheduling a job of the validation process across the computing devices. According to an embodiment of the present disclosure, any one of the computing devices on Windows can act like the enterprise management server (302). The management server (302) invokes a command line mode of the validation tool.

The validation tool (102 of FIG. 1) may be capable for validating the configuration settings for a single server in a one click action or across multiple servers in a one click action. The validation tool (102 of FIG. 1) may be installed over the each of the computing devices over the network. The enterprise management server (302) may be configured to invoke the validation tool (102 of FIG. 1) through the command line mode of GUI mode. Further, the validation tool (102 of FIG. 1) may be configured for verifying the existing configuration settings of the computing devices in accordance with the requirements of the enterprise application. The step of verification of the existing configuration settings may be performed by the verification module (108 of FIG. 1). Along with the verification, the validation tool (102 of FIG. 1) also provides an apply option for applying the required configuration settings on the computing devices. The step of applying the required configuration settings may be performed by the applying module (110 of FIG. 1). The applying module (110 of FIG. 1) may be configured to firstly verify the existing configuration settings across the computing devices and then apply the required configuration settings across the computing devices; if the existing configuration setting is not present as per the optimal configuration settings or it is not in accordance with the requirements. Upon verifying the existing configuration settings and applying the required configuration settings, a compliance report may be generated. The compliance report generated may be further notified to the intended user of the group through an electronic communication.

The methodology and techniques described with respect to the exemplary embodiments can be performed using a computer-implemented system or other computing device within which a set of instructions, when executed, may cause the said computer-implemented system to perform any one or more of the methodologies discussed above. The computer-implemented system may include a processor embedded within the computer-implemented system which may be configured for executing the programmed instructions or the set of instructions. The computer-implemented system may be configured from different modules; each module may be configured for executing programmed instructions or set of instruction to perform a particular task. According to the embodiments of the present disclosure, the computer-implemented system may also operate as a standalone device.

In accordance with various embodiments of the present disclosure, the methods described herein are intended for operation as software programs running on a computer processor—[processor embedded within the said computer-implemented system].

Although the disclosure has been described in terms of specific embodiments and applications, persons skilled in the art can, in light of this teaching, generate additional embodiments without exceeding the scope or departing from the spirit of the disclosure described herein.

We claim:

1. An processor-implemented method for validating configuration settings across different levels of computing devices for an enterprise application, the method comprising:
    setting parameters of a configuration file for a computing environment, wherein the computing environment includes server setup documents and end-users computer setup documents;
    generating a graphical user interface (GUI);
    prompting a user to select an option and one or more corresponding parameters through the GUI to execute a validation process;
    performing the validation process, after obtaining the option and the one or more corresponding parameters selected by the user, the validation process being performed by at least one of:
        verifying existing configuration settings of computing devices associated with the computing environment and their interactions in relation to preset parameters for complying with the enterprise application; and
        applying required configuration settings based on preset parameters across the computing devices, if the existing configuration settings of the computing devices are not compliant with optimal configuration settings, wherein the required configuration settings are stored in a xml or a config file;
    generating a compliance report upon performing the validation process; and
    notifying the compliance report generated to an intended person or a group via an electronic communication.

2. The method of claim 1, wherein the optimal configuration settings are the standard settings stored in the XML or config file against which the existing configuration settings are verified or the required configuration settings are applied over the computing devices.

3. The method of claim 1, wherein the different levels of computing devices include server level computing devices, end-user level computing devices and application level computing devices.

4. The method of claim 1, wherein the option selected by the user includes a verifying option for verifying the required configuration settings, an applying option for applying the required configuration settings or both.

5. The method of claim 1, wherein the xml or the config file includes optimal configuration settings for:
    .net based web applications;
    Internet Information Services (IIS) where Windows Communication Foundation (WCF) and Active Server Methods (ASMX) based services and web applications are hosted;
    .net based web or windows applications which are invoking WCF and/or ASMX services; and
    Win-Form applications.

6. The method of claim 1, wherein the required configuration settings can be updated or a new element can be added to it upon inclusion of additional servers or end-user computers or additional applications to the enterprise or upgrade to any these.

7. The method of claim 1, wherein the compliance report comprises of a compliance percentage summary which is calculated based on assigned score, priority and weightage to logical category, wherein the logical category comprises of different configuration settings and their respective attributes.

8. The method of claim 1, wherein the electronic communication may be at least one of: an e-mail communication; and a short message service (SMS).

9. A system for validating configuration settings across different levels of computing devices for an enterprise application, the system comprising: a memory unit for storing a set of instructions; a processor coupled to the memory unit, wherein the processor, responsive to the set of instructions, is configured to enable:
    an input device configured to:
        set parameters of a configuration file according to a computing environment, wherein the computing environment includes server setup documents and end-users computer setup documents; and
        capture user input for selecting an option and one or more corresponding parameters through a graphical user interface (GUI), wherein the GUI is invoked upon executing an exe file;
    a verification module, in response to the option and the one or more parameters selected by the user, configured to verify existing configuration settings across the computing devices and their interaction in relation to preset parameters for complying with the enterprise application;
    an applying module configured to apply required configuration settings based on the preset parameters, if the existing configuration settings of the computing devices are not compliant with optimal configuration settings, wherein the required configuration settings are stored in a xml file or a config file;
    a report generation module configured to generate a compliance report upon validation of the existing configuration settings; and a notification module configured to notify the compliance report generated to an intended person or a group via an electronic communication.

10. The system of claim 9, wherein the optimal configuration settings are the standard settings stored in the XML or config file against which the existing configuration settings are verified or the required configuration settings are applied over the computing devices.

11. The system of claim 9, wherein the different levels of computing devices include server level computing devices, end-user level computing devices and application level computing devices.

12. The system of claim 9, wherein the xml or the config file includes optimal configuration settings for:
- net based web applications;
- Internet Information Services (IIS) where Windows Communication Foundation (WCF) and Active Server Methods (ASMX) based services and web applications are hosted;
- net based web or windows applications which are invoking WCF and/or ASMX services; and
- Win-Form applications.

13. The system of claim 9, wherein the required configuration settings can be updated or a new element can be added to it upon inclusion of additional servers or end-user computers or additional applications to the enterprise or upgrade to any these.

14. The system of claim 9, wherein the electronic communication may be at least one of: an e-mail communication; and a short message service (SMS).

15. The system of claim 9, wherein the system is an anticipative tool to schedule downtime and predictive failures.

16. The system of claim 9, wherein the compliance report comprises of a compliance percentage summary which is calculated based on assigned score, priority and weightage to logical category, wherein the logical category comprises of different configuration settings and their respective attributes.

* * * * *